United States Patent [19]

Köppl

[11] Patent Number: 4,663,691
[45] Date of Patent: May 5, 1987

[54] SAFETY MECHANISM FOR ELECTRICAL POWER LINE

[75] Inventor: Georg Köppl, Birr, Switzerland

[73] Assignee: BBC Brown, Boveri & Company, Limited, Baden, Switzerland

[21] Appl. No.: 760,576

[22] Filed: Jul. 30, 1985

[30] Foreign Application Priority Data

Jul. 31, 1984 [CH] Switzerland ............... 3694/84

[51] Int. Cl.$^4$ ............................................. H02H 7/22
[52] U.S. Cl. ........................................ 361/65; 361/79
[58] Field of Search ................................. 361/62–67, 361/79, 44–49, 50, 82, 84, 85

[56] References Cited

U.S. PATENT DOCUMENTS 3,963,964 6/1976 Mustaphi ........................... 361/85
4,432,031 2/1984 Premerlani ........................ 361/63

Primary Examiner—A. D. Pellinen
Assistant Examiner—H. L. Williams
Attorney, Agent, or Firm—Burns, Doane, Swecker & Mathis

[57] ABSTRACT

A safety mechanism is described which is used in an electrical distributing system with a bus-bar and of branches emanating from the bus-bar and has safety relays which turn off the malfunctioning part of the system in case of error. In this safety mechanism, redundancy is increased with respect to a malfunctioning of any one of the relays while the number of safety relays remains the same. This is achieved by the fact that each of the safety relays responds to a measurement of currents and voltages of two branches and acts upon both branches via the switches separating them from the mains.

10 Claims, 5 Drawing Figures 4,663,691

SAFETY MECHANISM FOR ELECTRICAL POWER LINE

BACKGROUND OF THE INVENTION

The invention relates to a safety mechanism for electrical power lines wherein safety relays are associated with switches connecting branch lines to the power line.

The state of the art of such safety mechanisms is described in Brown Boveri Reports 1/2-83, volume 70, pages 101 to 102. In known safety mechanisms, the objects connected to an energy distribution mains, such as branches emanating from a bus-bar, are protected by a safety relay which actuates a switch located between an object where an error has appeared and the remaining mains. In order to increase the redundancy of such a safety mechanism it has been necessary to provide another safety relay for each object being protected.

OBJECTS AND SUMMARY OF THE INVENTION

An object of the invention is to increase the redundancy of the generic safety mechanism while using the same number of safety relays.

This object is accomplished by connecting each safety relay to plural switches. The safety mechanism presented by the invention is characterized by the fact that the number of objects and safety relays are the same, but the redundancy of the safety mechanism is at least doubled if one of the relays malfunctions.

The invention is described in greater detail below with reference to the drawings illustrating exemplary embodiments.

DETAILED DESCRIPTION

Figure 1:
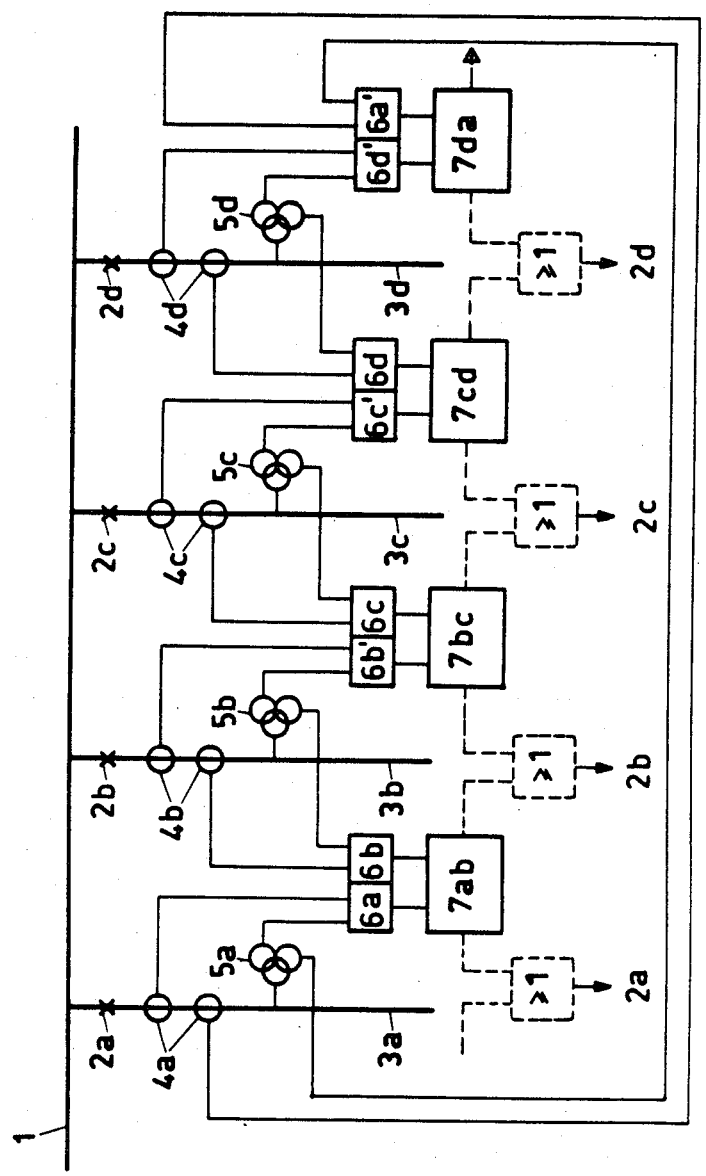
FIG. 1 is a section of a block circuit diagram of a power distribution system according to a first embodiment of the invention.

In the section of a distributing system depicted in FIG. 1, a bus-bar is designated with the number 1. The bus-bar can be connected across power switches 2a, 2b, 2c and 2d, with branches, 3a, 3b, 3c, and 3d, that are sequenced along the bus-bar. Meters that are designed as transformers, 4a, 4b, 4c, and 4d, and as voltage converters, 5a, 5b, 5c, and 5d, and which measure the current and voltage state of each branch, 3a, 3b, 3c, and 3d, and which direct the intercepted signals to the inputs of two accumulators, 6a,6a'; 6b,6b'; 6c,6c'; and 6d,6d', are attached to each of the branches, 3a–3d. The outlets of the accumulators, 6a and 6b, are connected to the inputs of a safety relay, 7ab. Similarly, the outlets of the accumulators, 6b' and 6c, are connected to the inputs of a safety relay, 7bc; the outlets of the accumualators, 6c' and 6d, are connected to the inputs of a safety relay, 7cd; and the outlets of the accumulators, 6d'0 and 6a', are connected to the inputs of a safety relay, 7da. Each of the safety relays, 7ab, 7bc, 7cd, and 7da, have two outlets. A first outlet of the safety relay, 7ab and a second outlet of the safety relay, 7bc, for example are connected to an actuator (not shown) of the switch, 2b, through an OR element. A second outlet of the safety relay, 7ab, and a first outlet of the safety relay, 7da, are similarly connected to the switch, 2a; in the same manner, a first outlet of the safety relay, 7bc, and a second outlet of the safety relay, 7cd, are connected to the switch, 2c, a first outlet of the safety relay, 7cd, and a second outlet of the safety relay, 7da, are connected to the switch, 2d. The safety relays, therefore, are wired between every two of the directly consecutive branches along the bus-bar.

The switch, 2a; the connection from the switch, 2a, to the safety relay, 7ab; the connection from the safety relay, 7ab, to the switch 2b; the switch, 2b; the connection from the switch, 2b, to the safety relay, 7bc; the safety relay, 7bc; the connection from the safety relay, 7bc, to the switch, 2c; the switch, 2c; the connection from the switch, 2c, to the safety relay, 7cd; the safety relay, 7cd; the connection from the safety relay, 7cd, to the switch, 2d; the connection from the switch, 2d, to the safety relay, 7da; the safety relay, 7da; and the connection from the safety relay, 7da, to the switch, 2a, form a ring. This ring can include all safety relays and switches of the safety mechanism presented by the invention, but can also contain only two safety relays or switches as will be explained in the example illustrated in FIG. 3. It is conceivable that numerous rings could form the safety mechanism presented by the invention (partial rings).

Figure 2:
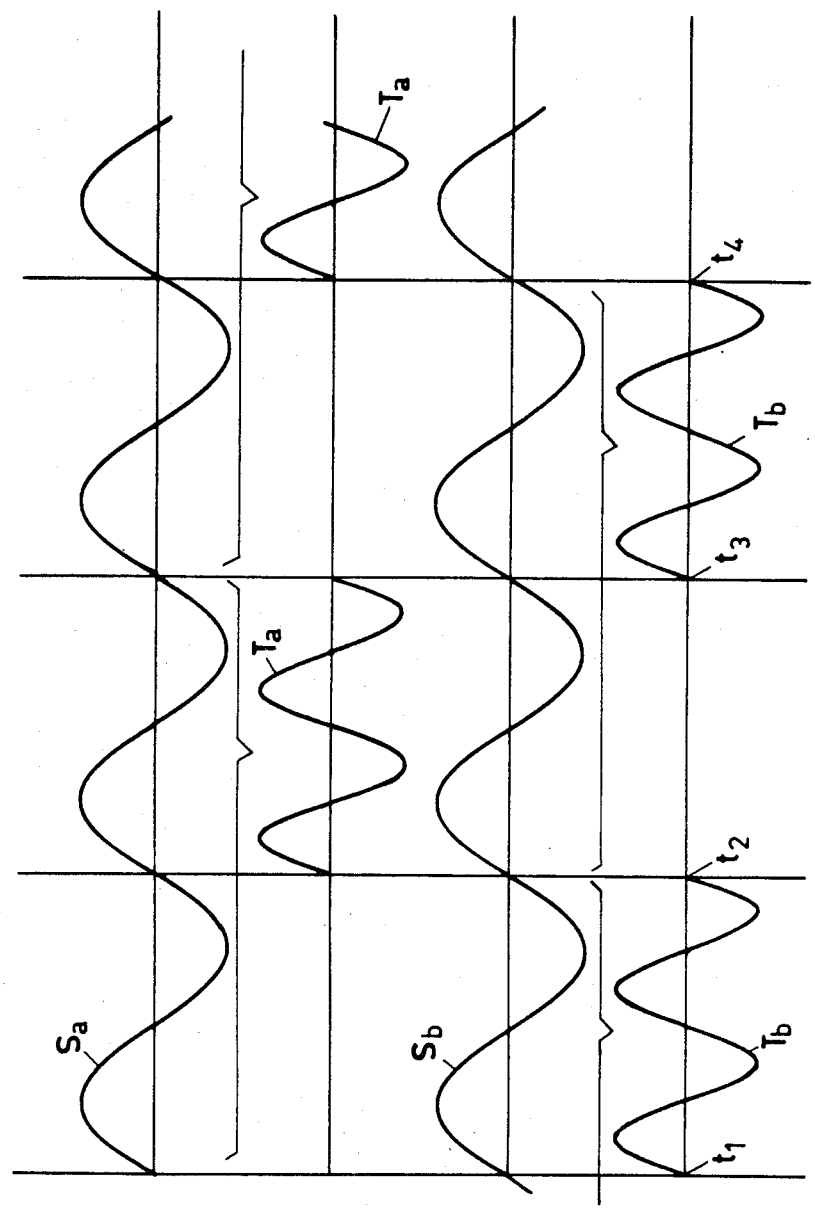
FIG. 2 is a graphical representation of the state of a branch of the power distribution system over a period of time.

The safety mechanism works as follows: The transformers and voltage converters, 4a–4d and 5a–5d, that are attached to each of the branches, 3a–3d, constantly intercept the currents and voltages in these branches. The current and voltage signals can be processed, for example, as in FIG. 2, in the following manner:

After time, $t_1$, the current and voltage signals, $S_a$, of the transformers and voltage converters, 4a, 5a, of the branch, 3a, for example over a period of two cycles of the power line a.c. frequency, are scanned, digitalized and put into an accumulator, 6a. One cycle later after time, $t_2$, the signals in the accumulator, 6a, as well as the data yet to be stored in subsequent cycles are recalled and processed successively by the relay, 7ab. Each recall and processing follows during the negative half-cycle of the a.c. oscillation after time, $t_2$, and leads the formation of signal, $T_a$. If signal $T_a$ exceeds a fixed value because of an error in the branch, 3a, then the safety relay, 7ab, emits an activation signal to the actuator of the switch, 2a, through the connected OR element whereby the switch, 2a, is opened and the branch, 3a, is electrically isolated from the bus-bar, 1. After the completion of two cycles, i.e. at time $t_3$, the data of the signal, $S_a$, stored in the accumulator, 6a, is deleted. In the two cycles following time $t_3$, the signals, $S_a$, measured in the branch, 3a, are then stored again in the accumulator.

At time $t_2$, not only the data already stored in the accumulator are recalled, but simultaneously also the signals, $S_b$, of the transformers and voltage converters, 4b, 6b, of the branch, 3b, are scanned, digitized, and stored in the accumulator, 6b. One cycle later at time $t_3$, the data already stored in the accumulator, 6b, as well as the data yet to be stored in the subsequent cycle are successively recalled and processed by the relay, 7ab. The data are recalled and processed during the negative half-cycle of the a.c. oscillation following time $t_3$ and leads to the formation of the signal $T_b$. If signal $T_b$ exceeds a fixed value because of an error in the branch, 3b, then the safety relay, 7ab, emits an activation signal to the non-illustrated actuator of the switch, 2b, is opened and the branch, 3b, is separated from the bus-bar, 1. After two complete cycles following time $t_2$, the data stored in the accumulator, 6b, of the signal $S_b$ are also deleted. In the two cycles following time $t_4$, the signals $S_a$ measured in the branch, 3a, are then stored again in the accumulator, 6a.

It is conceivable that the safety relay, 7ab, malfunctions so that the switches, 2a or 2b, now can no longer be opened by the safety relay, 7ab, if there is an error in one of the branches, 3a or 3b. But the branch, 3a or 3b, remains protected given the safety mechanism described here because the signals of the transformer and voltage converter, 4a and 5a or 4b and 5b, attached to the branches, 3a or 3b, have an effect on the safety relays, 7da or 7bc, so that, for example, if there is an error in branch 3b, the safety relay, 7bc, still causes the switch 2b to open.

Figure 3:
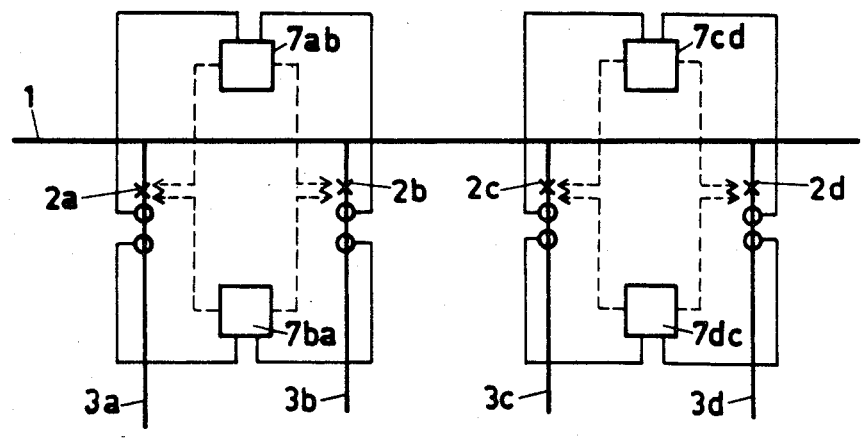
FIG. 3 is a section of a block circuit diagram of a power distribution system according to a second embodiment of the invention.

In the example depicted in FIG. 3, two safety relays, e.g. 7ab and 7ba or 7cd and 7dc, are located between every two branches, e.g. 3a and 3b or 3c and 3d. This type of design is especially uncomplicated and can be used for an even number of branches. For reasons of a simpler explanation, as for the example shown in FIG. 4, the metering points of the transformer and voltage converter that are connected to one of the branches, e.g. 3a, and to one of the safety relays, e.g. 7ab, are depicted as a circle and the accumulators connected to the safety relays, e.g. 7ab, are omitted.

Figure 4:
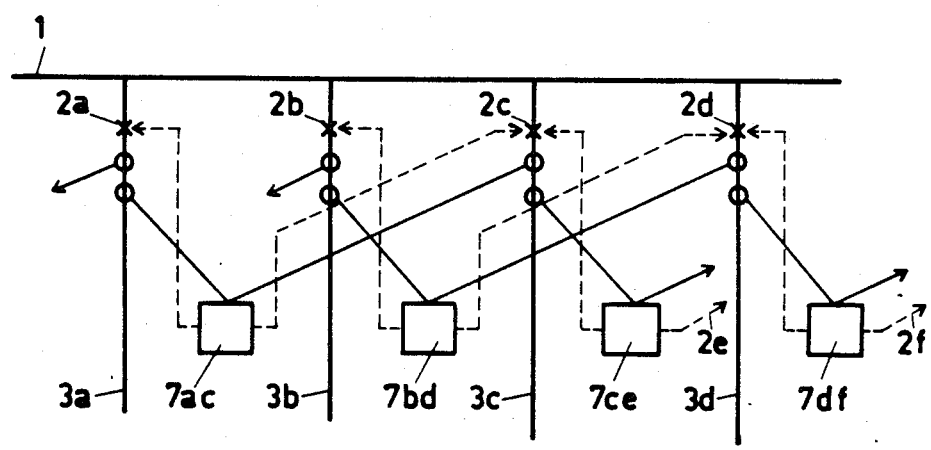
FIG. 4 is a section of a block circuit diagram of a power distribution system according to a third embodiment of the invention.

In the example depicted in FIG. 4, each of the safety relays, e.g. 7ac, are placed between two branches, e.g. 3a, 3c, between which there is a third branch, e.g. 3b, from the branches, e.g. 3a, 3b, 3c, along the bus-bar, 1, that are directly consecutive. Such a design can be used advantageously for an uneven number of branches and offers the advantage of a compact structure particularly for branches running in different directions, e.g. 3a and 3c downwards and 3b and 3d upwards. Of course, it is also conceivable that two or more branches are positioned between every two branches connected to a safety relay.

Figure 5:
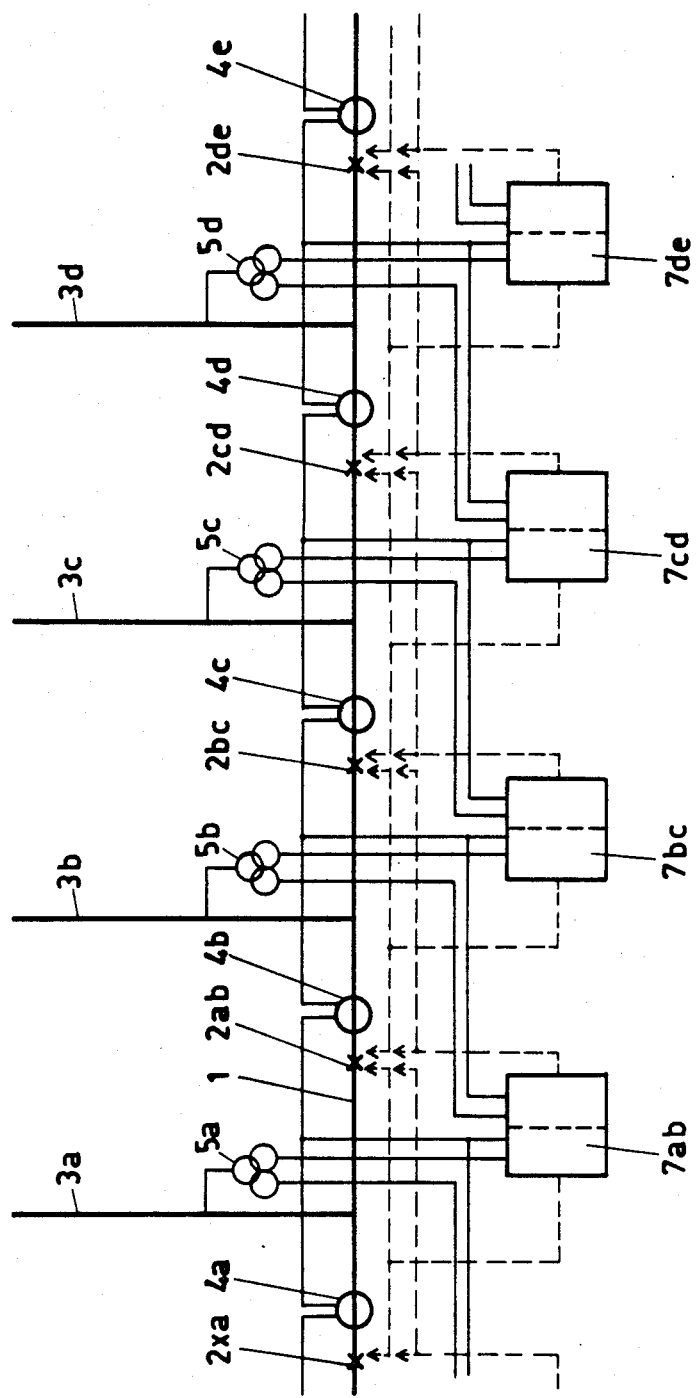
FIG. 5 is a section of a block circuit diagram of a power distribution system according to a fourth embodiment of the invention.

In FIG. 5, another example of the safety mechanism presented by the invention is depicted in a distributing system with a bus-bar, 1, that is shaped as a ring. In this bus-bar, a switch, e.g. 2ab, 2bc, 2cd, is located between every two branches, e.g. 3a and 3b, 3b and 3c, 3c and 3d, that are directly consecutive along the bus-bar. Each of the branches, e.g. 3a or 3d, therefore, can be switched out of the bus-bar by two switches, e.g. 2xa and 2ab or 2cd and 2de. In this case as well, the metering points of the transformer and voltage converter, e.g. 4a, 5a and 4b, 5b, of every pair of branches, e.g. 3a and 3b, influence a safety relay, e.g. 7ab, connected to these two branches. Contrary to afore-described designs, in this case the transformers, e.g. 4a and 4b, are wired into the bus-bar and each of the connections of the safety relay, e.g. 7ab, illustrated with slashes, acts simultaneously on both switches, e.g. 2xa, 2ab, separating one of the branches, e.g. 3a, from the bus-bar, 1.

The safety mechanism of the invention can not only be used in the embodiments described above, but can also be used advantageously in different configurations with, for example, $1\frac{1}{2}$ circuit diagrams, 2 circuit diagrams or bus-bar configurations with bypass bars.

Furthermore, the safety mechanism presented by the invention can be used generally in power distribution mains, e.g. for wiring sections which are protected by differential relays. Such sections, for example, would be provided if, taking the example provided in FIG. 3, instead of the connection existing through the bus-bar, 1, between the switches, 2a and 2b, there is a transmission wire. In this case, the safety relays, 7ab and 7ba, are designed as differential safety relays.

The transformers and voltage converters, e.g. 4a and 5a, provided in each of the branches, e.g. 3a, usually have one metering point per safety relay, e.g. 7ab, 7da.

Instead of two safety relays, three or even more safety relays can be connected to a branch or to one of the objects to be protected In this case, each of the safety relays controls the states of three or more branches or objects and is connected to each of the switches which connects these branches or objects to the bus-bars or to the remaining mains. As a result, redundancy is increased once again using the same number of safety relays.

The safety relays of all branches of a bus-bar can be concentrated locally in a container or in some other area whereby it is easily possible to form cumulative currents from the currents and their directions available in all the branches. Thereby, it is possible to monitor the function of the transformer and also to realize an extremely simple and cost-effective bus-bar safety system.

What is claimed is:

1. A safety mechanism for an electrical distribution system having a bus-bar and at least three branches, each of said at least three branches being connected to or disconnected from said bus-bar by a switch, said mechanism comprising:

first metering means for measuring a current state and a voltage state of a first branch of said at least three branches;

second metering means for measuring a current state and a voltage state of a second branch of said at least three branches;

third metering means for measuring a current state and a voltage state of a third branch of said at least three branches;

first accumulator means for storing the measured current state and the measured voltage state of said first branch;

second accumulator means for storing the measured current state and the measured voltage state of said second branch;

third accumulator means for storing the measured current state and the measured voltage state of said third branch;

fourth accumulator means for storing the measured current state and the measured voltage state from one of the first branch, the second branch, and a further branch;

a first safety relay having a first input connected with an outlet of said first accumulator means and a second input connected with an outlet of said second accumulator means, and having a first outlet connected with first actuating means for operating said switch for connecting or disconnecting said first branch from said bus-bar, and a second outlet connected with second actuating means for operating said switch for connecting or disconnecting said second branch from said bus-bar; and a second safety relay having a first input connected with an outlet of said third accumulator means and a second input connected with an outlet of said fourth accumulator means, and having a first outlet connected with third actuating means for operating said switch for connecting or disconnecting said third branch from said bus-bar, and a second outlet connected with actuating means for operating a switch for connecting or disconnecting one of said first branch, said second branch and said further branch from said bus-bar.

2. The safety mechanism of claim 1, wherein said switches connecting or disconnecting said first and said second branch and said first and said second safety relay are connected to each other in form of a ring.

3. The safety mechanism of claim 1, wherein said branches are consecutive branches of said bus-bar and wherein at least one of said at least two safety relays is located between the directly consecutive branches.

4. The safety mechanism of claim 3, wherein said switches connecting or disconnecting said first and said second branch and said first and sais second safety relay are connected to each other in form of a ring.

5. The safety mechanism of claim 1, wherein said branches are consecutive branches of said bus-bar and wherein at least one of said at least two safety relays is located between two branches between which there is another of the consecutive branches.

6. The safety mechanism of claim 5, wherein said switches connecting or disconnecting said first and said second branch and said first and said second safety relay are connected to each other in form of a ring.

7. The safety mechanism of claim 1, wherein an OR element is located between the outlets of said first and said second relay and the actuating means of a switch for connecting or disconnecting the branch protected by said first and said second safety relay.

8. The safety mechanism of claim 7, wherein said switches connecting or disconnecting said first and said second branch and said first and said second safety relay are connected to each other in form of a ring.

9. A safety mechanism for an electrical distribution system having a bus-bar and at least three branches, each of said at least three branches being electrically connected or disconnected to said bus-bar by two switches arranged along the bus-bar, said mechanism comprising:

first metering means for measuring a current state and a voltage state of a first branch of said at least three branches;

second metering means for measuring a current state and a voltage state of a second branch of said at least three branches;

third metering means for measuring a current state and a voltage state of a third branch of said at least three branches;

first accumulator means for storing the measured current state and the measured voltage state of said first branch;

second accumulator means for storing the measured current state and the measured voltage state of said second branch;

third accumulator means for storing the measured current state and the measured voltage state of said third branch;

fourth accumulator means for storing the measured current state and the measured voltage state from one of the first branch, the second branch, and a further branch;

a first safety relay having a first input connected with an outlet of said first accumulator means and a second input connected with an outlet of said second accumulator means, and having a first outlet connected with first actuating means for operating said switches for connecting or disconnecting said first branch from said bus-bar, and a second outlet connected with second actuating means for operating said switches for connecting or disconnecting said second branch from said bus-bar; and a second safety relay having a first input connected with an outlet of said third accumulator means and a second input connected with an outlet of said fourth accumulator means, and having a first outlet connected with third actuating means for operating said switch for connecting or disconnecting said third branch from said bus-bar, and a second outlet connected with actuating means for operating a switch for connecting or disconnecting one of said first branch, said second branch and said further branch from said bus-bar.

10. The safety mechanism of claim 9, wherein said switches connecting or disconnecting said first and said second branch and said first and said second safety relay are connected to each other in form of a ring.

* * * * *